(12) United States Patent
Milhiser

(10) Patent No.: US 10,448,788 B1
(45) Date of Patent: Oct. 22, 2019

(54) CUTTING BOARD WITH REMOVABLE, REPOSITIONABLE, RETAINING SIDES

(71) Applicant: Smart Chopping, LLC, Westfield, NJ (US)

(72) Inventor: Carolyn Milhiser, Westfield, NJ (US)

(73) Assignee: Smart Chopping, LLC, Westfield, NJ (US)

( * ) Notice: Subject to any disclaimer, the term of this patent is extended or adjusted under 35 U.S.C. 154(b) by 28 days.

(21) Appl. No.: 15/196,390

(22) Filed: Jun. 29, 2016

Related U.S. Application Data

(60) Provisional application No. 62/193,325, filed on Jul. 16, 2015.

(51) Int. Cl.
*A47J 47/10* (2006.01)
*A47J 47/16* (2006.01)
*A47J 47/00* (2006.01)

(52) U.S. Cl.
CPC .................................. *A47J 47/005* (2013.01)

(58) Field of Classification Search
CPC .... A47J 47/005; A47J 47/16; Y10T 29/49826
USPC ..... 83/167, 130; 220/507, 522; 269/290, 16, 269/311, 289 R; 248/304, 205.1
See application file for complete search history.

(56) References Cited

U.S. PATENT DOCUMENTS 2,398,192 A * 4/1946 Scheminger, Jr. .... B26B 29/063
83/762
3,058,503 A * 10/1962 Perakis ................. B26B 29/063
83/764
4,131,043 A * 12/1978 Colman ................ B26B 29/063
269/902
4,133,238 A * 1/1979 Jacobs .................. B26B 29/063
83/466.1
D262,507 S 1/1982 Wooldridge
D270,601 S 9/1983 Price
4,447,051 A * 5/1984 Price ..................... A47J 47/005
141/98
D303,198 S 9/1989 Schorn
5,203,548 A 4/1993 Sanders
5,382,009 A 1/1995 Mertz
5,386,978 A 2/1995 Ladwig
(Continued)

*Primary Examiner* — Ghassem Alie
(74) *Attorney, Agent, or Firm* — James Creighton Wray; Meera P. Narasimhan

(57) ABSTRACT

A new cutting and chopping board assembly has edges with attachments and removable and repositionable sides with complementary attachments on or in the sides for attaching the sides to the edges of the cutting and chopping board. The sides trap cut and chopped pieces within the sides on the cutting and chopping board. The sides are selectively slidable and repositionable along the edges of the cutting and chopping board. Grooves in edges of the board hold magnets or magnetically attractable material such as stainless steel. The sides hold complementary attachments of magnetically attractable material such as stainless steel or magnets. The attachments and complementary attachments may both be magnets. A tongue and groove embodiment employs grooves in edges of the cutting and chopping board and tongues extending from the sides that extend into the grooves. One or more sides may be removed or slid rearward for cutter or chopper access.

5 Claims, 7 Drawing Sheets

(56) References Cited

U.S. PATENT DOCUMENTS

| | | | | |
|---|---|---|---|---|
| 5,415,461 A * | 5/1995 | Sakamoto | ............... | A47C 4/02 |
| | | | | 297/411.26 |
| D362,374 S * | 9/1995 | Roach | ............... | D7/673 |
| 5,680,803 A * | 10/1997 | Vizurraga | ............... | B26B 29/063 |
| | | | | 83/468.5 |
| 6,142,332 A | 11/2000 | Ferrara | | |
| 6,371,470 B1 | 4/2002 | Ward | | |
| 6,460,841 B1 * | 10/2002 | Durr | ............... | A47J 47/005 |
| | | | | 269/289 R |
| 6,478,293 B1 | 11/2002 | Keener | | |
| 6,644,639 B1 | 11/2003 | Newton | | |
| 6,772,552 B2 * | 8/2004 | Parrish | ............... | A01K 85/02 |
| | | | | 43/35 |
| 7,213,885 B2 * | 5/2007 | White, III | ............... | A47C 13/005 |
| | | | | 248/188 |
| 7,252,255 B2 * | 8/2007 | Cornfield | ............... | A47J 47/005 |
| | | | | 241/274 |
| 7,322,573 B1 * | 1/2008 | Edmond | ............... | A47J 47/005 |
| | | | | 269/289 R |
| 7,441,740 B2 * | 10/2008 | Drew | ............... | A47B 95/043 |
| | | | | 108/27 |
| 7,547,073 B2 * | 6/2009 | White, III | ............... | A47C 13/005 |
| | | | | 248/188 |
| 7,553,390 B2 * | 6/2009 | Yamabuchi | ............... | C03B 33/033 |
| | | | | 156/250 |
| 8,122,800 B2 * | 2/2012 | Correa | ............... | A47J 47/005 |
| | | | | 220/507 |
| 8,141,860 B2 * | 3/2012 | Goldman | ............... | A47J 47/005 |
| | | | | 269/285 |
| 8,297,606 B2 * | 10/2012 | Phillips | ............... | A47J 47/005 |
| | | | | 269/289 R |
| 8,356,788 B2 * | 1/2013 | Drew | ............... | A47B 95/043 |
| | | | | 108/27 |
| 8,590,877 B2 | 11/2013 | Zeitlin | | |
| 8,720,879 B1 * | 5/2014 | Schrimper | ............... | A47J 47/00 |
| | | | | 269/16 |
| 8,757,602 B2 * | 6/2014 | Bagley | ............... | A47J 47/005 |
| | | | | 210/232 |
| 8,770,562 B1 * | 7/2014 | Blum | ............... | A47J 47/005 |
| | | | | 269/13 |
| 9,271,609 B2 * | 3/2016 | Karalius | ............... | A47J 47/005 |
| 9,636,831 B1 * | 5/2017 | Furia | ............... | B26B 29/063 |
| 2009/0051608 A1 * | 2/2009 | Johnson | ............... | H01Q 1/1242 |
| | | | | 343/713 |
| 2009/0283952 A1 * | 11/2009 | Sellers | ............... | A47J 47/005 |
| | | | | 269/289 R |
| 2010/0186169 A1 * | 7/2010 | Kelly | ............... | A47D 15/008 |
| | | | | 5/655 |
| 2012/0119629 A1 * | 5/2012 | Nelson | ............... | A47B 87/00 |
| | | | | 312/111 |
| 2012/0315599 A1 * | 12/2012 | Mullaly | ............... | A61C 8/0048 |
| | | | | 433/173 |
| 2013/0043633 A1 * | 2/2013 | Schmidt | ............... | A47J 47/005 |
| | | | | 269/290 |
| 2014/0097566 A1 * | 4/2014 | Rivera | ............... | A47J 47/005 |
| | | | | 269/16 |
| 2014/0251866 A1 * | 9/2014 | Smallman | ............... | B65D 1/34 |
| | | | | 206/557 |

* cited by examiner

CUTTING BOARD WITH REMOVABLE, REPOSITIONABLE, RETAINING SIDES

This application claims the benefit of U.S. Provisional Application No. 62/193,325 filed Jul. 16, 2015, which is hereby incorporated by reference in its entirety as if fully set forth herein.

SUMMARY OF THE INVENTION

A new cutting and chopping board assembly has edges with attachments and removable and repositionable sides with complementary attachments on or in the sides for attaching the sides to the edges of the cutting and chopping board. The sides trap cut and chopped pieces within the sides on the cutting and chopping board. The sides are selectively slidable and repositionable along the edges of the cutting and chopping board. Grooves in edges of the board hold magnets or magnetically attractable material such as stainless steel. The sides hold complementary attachments of magnets that are magnetically attractable materials such as stainless steel or magnets. The attachments and complementary attachments may both be magnets. A tongue and groove embodiment employs grooves in edges of the cutting and chopping board and tongues extending from the sides that extend into the grooves. One or more sides may be removed for cutter or chopper access. Sliding sides rearward provide greater access.

The invention provides a cutting and chopping board with detachable, repositionable sides. The cutting and chopping board can be fabricated from wood, pressed wood, plastic or bamboo. The edges of the cutting and chopping board can have magnetic metal insets such as 430 stainless steel, magnet insets such as neodymium magnets or grooves. The sides are fabricated from sheet material such as plastic and can include magnets (neodymium magnets) or magnetic metal (430 stainless steel) or can be shaped into a tongue to fit in a groove in the edge of the board. The sides are held in place by the magnetic force between the stainless steel and the magnets or the tongue and groove method. When in place, the sides act as barriers, preventing food from rolling or being propelled off a board during chopping and cutting. Food can be easily pushed with a chopping knife to the sides of the board without dropping off the board. The usable area of the board within the sides that prevent the spilling over of cut or chopped particles is maximized. The sides keep the food on the board, thus eliminating food waste and mess on the countertop. The front side or wall can be removed to facilitate knife access. The sides can be detached and used for sweeping food from the board into bowls or cookware. With the sides removed, the board is a generic cutting and chopping board that can be used for cutting or slicing foods that do not require lateral protection against loss. The sides can be easily removed or repositioned with minimal effort by either breaking the magnetic bond or by sliding the sides along the board when the tongue and groove method is used. The magnet bond can be broken either by pulling the sides off or sliding them along the board.

The invention is used with food products, or other products that require chopping or cutting. The invention would benefit any commercial chef or home cook. The invention is particularly beneficial in a commercial kitchen where large quantities of fruit and vegetables are prepared. The new products also would be valuable for chefs who operate in tight spaces, such as food trucks. Having removable sides is also beneficial when chefs prefer to use just the board without the attached sides when cutting certain foods like bread or watermelon. However, in other instances, like cutting kernels off corn cobs, a chef might prefer to use all four sides. The cutting and chopping board gives chefs the versatility to customize the cutting and chopping board arrangement for their individual preferences and needs whether using zero, one, two, three or four sides. Another benefit of the board is that it doesn't require much additional storage space. Without the sides, the cutting and chopping board can be stored like any other board and the sides can be stacked or laid flat in any cabinet or drawer.

The cutting and chopping board has sides that are attachable to the edges of the cutting and chopping board. Attachments on the edges of the cutting and chopping board attach the sides onto the edges of the cutting and chopping board. Complementary attachments on the sides cooperate with the attachments on the edges of the cutting and chopping board to hold the sides on the edges of the cutting and chopping board. Cut or chopped pieces are trapped by the sides on the cutting and chopping board.

When using the magnetic method, the sides are movable and repositionable along the edges of the cutting and chopping board. The sides are repositionable by sliding along the edges. The sides are removable by simply pulling the sides away from the board.

The attachments and the complementary attachments are magnetically attractable material and magnets.

The edges of the cutting and chopping board have grooves holding the magnetically attractable material or the magnets.

The magnetically attractable material is stainless steel strips embedded in the grooves in the edges of the cutting and chopping board and the magnets are mounted on the sides. The magnets are spaced along the sides. The stainless steel strips can also be mounted on the sides and the magnets can be embedded in the grooves.

When using the tongue and groove method, the sides are removable and repositionable by sliding the sides along the edges. Grooves are formed in the edges of the cutting and chopping board, and tongues are formed on the sides for insertion into the grooves which hold the sides on the edges of the cutting and chopping board. The sides are made of sheet material, and the tongues are folded portions of the sheet material.

The invention provides a cutting and chopping board having edges and sides for attaching to the cutting and chopping board.

Attachments on the edges of the cutting and chopping board cooperate with complementary attachments on the sides. Cut and chopped pieces are trapped within the sides on the cutting and chopping board.

Sliding and positioning the sides along the edges of the cutting and chopping board provides access to cutters and choppers.

Attachments are embedded into grooves in the edges of the cutting and chopping board.

Magnetically attractable strips and magnets are provided as complementary attachments in the sides.

The magnetically attractable strips are provided in the grooves in the edges of the cutting and chopping board. Spaced magnets are provided along the sides. Attachments can be switched so that the magnets are provided in the grooves in the edges of the cutting and chopping board and the magnetically attractable strips are provided along the sides.

When using the tongue and groove method, projecting tongues on the sides are pressed into the grooves in the edges of the cutting and chopping board.

DETAILED DESCRIPTION

Figure 1:
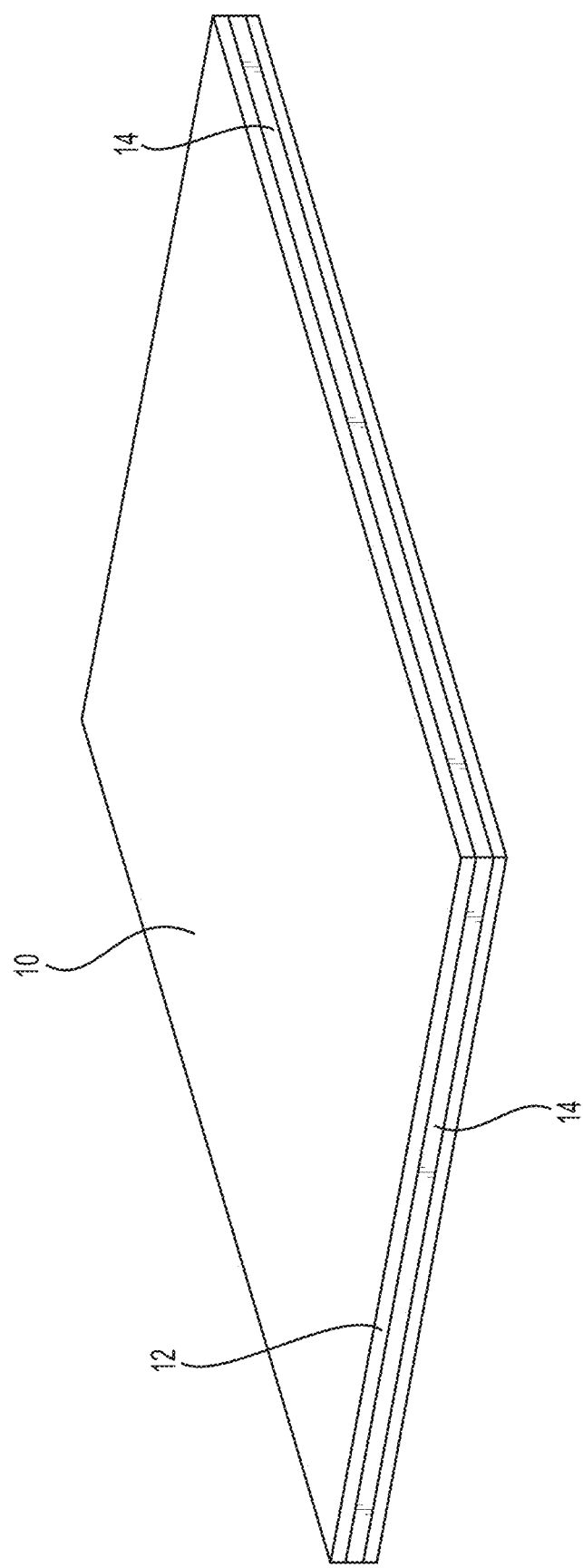
FIG. 1 is a perspective view of a wooden cutting and chopping board with 430 stainless steel strips inset along edges of the board in grooves around the board's perimeter.

FIG. 1 shows one embodiment of a cutting and chopping board 10 of the present invention. Strips of 430 stainless steel 14 are secured to edges 12 of the board 10.

Figure 2:
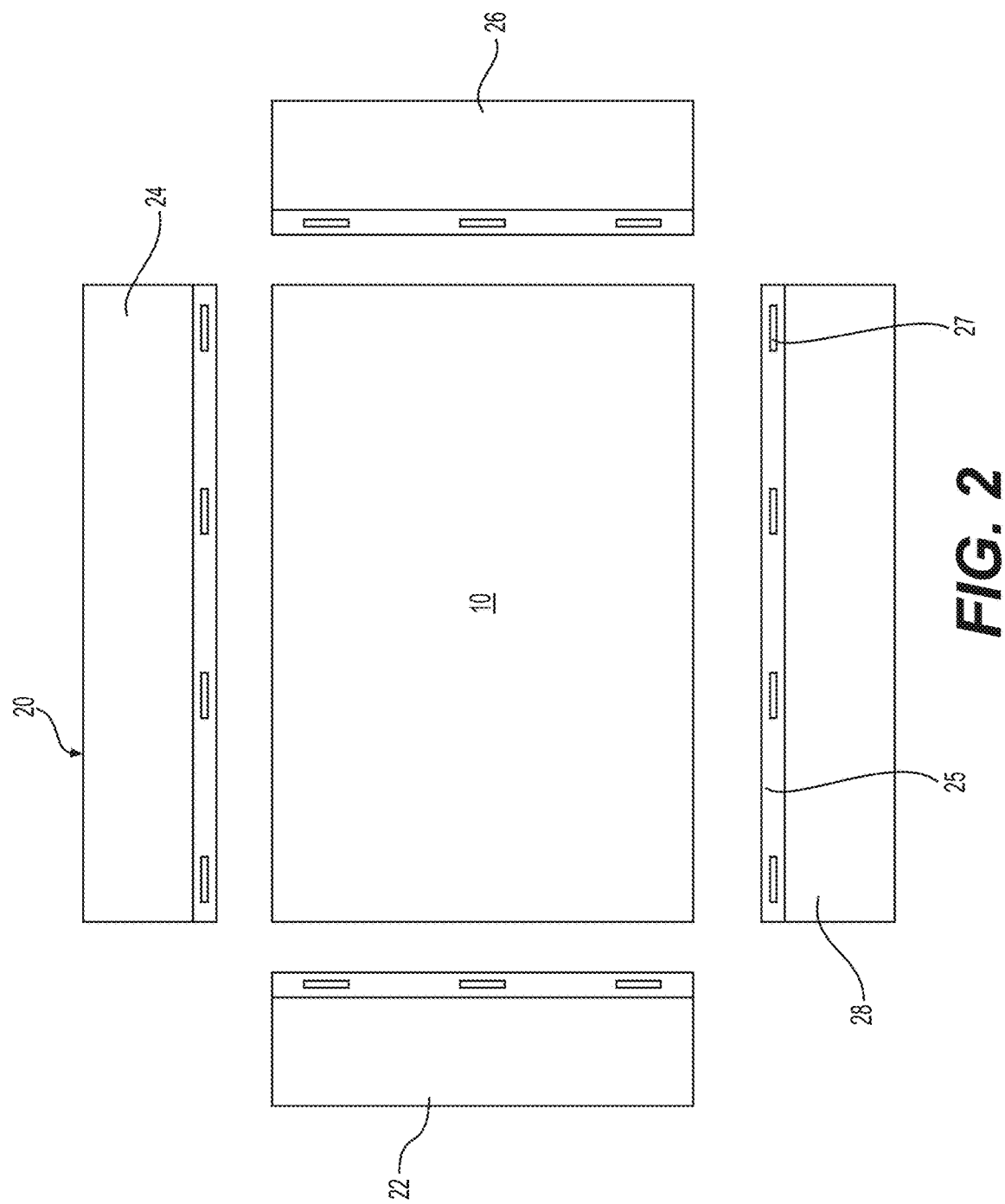
FIG. 2 is an exploded view of the cutting and chopping board shown in FIG. 1 with unattached, flexible, plastic sides that have neodymium magnets embedded and spaced along the lengths of each plastic side and positioned to be opposite the embedded stainless steel strips in the board edges.

FIG. 2 is an exploded view of the cutting and chopping board shown in FIG. 1 with plastic sides 20 embedded with neodymium magnets 27 in edges 25 of the sides 20 spaced from the 430 stainless steel strips 14 and laid along the cutting and chopping board 10. Attachable sides 20 include detachable and movable individual sides 22, 24, 26 and 28.

Alternatively, the board may have iron, steel or nickel bands or parts on or within edges of the board. The strips 14 attract magnets attached along bottoms of the removable sides.

In another embodiment, iron, steel or nickel strips or parts may be attached to bottoms of the sides to be attracted to the magnets in the edges of the cutting and chopping board.

Figure 3:
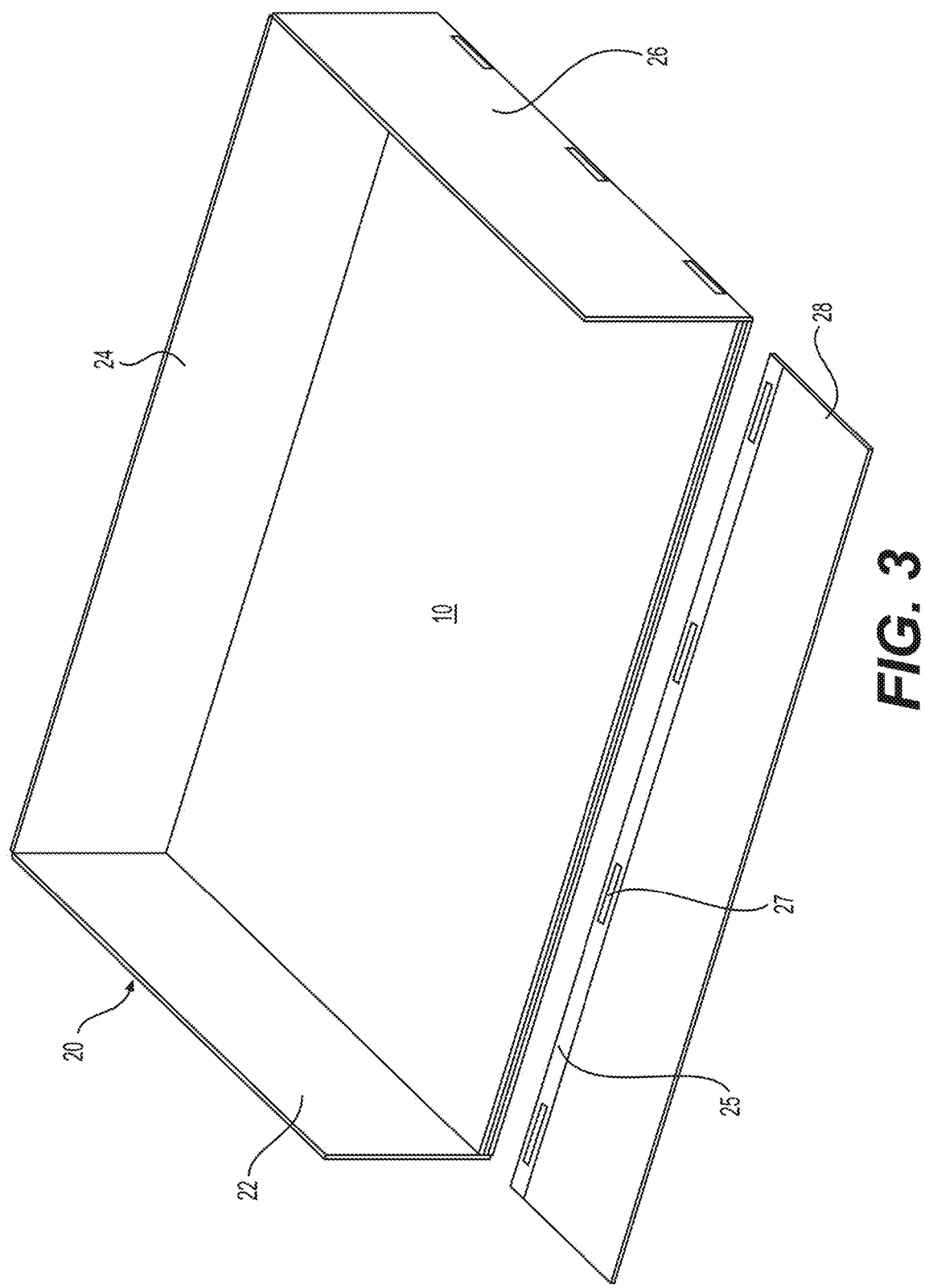
FIG. 3 is a perspective view of the cutting and chopping board shown in FIGS. 1 and 2 with three of the plastic sides attached to the cutting and chopping board using a magnetic bond between the 430 stainless steel strips inset in the cutting and chopping board and the neodymium magnets embedded in the plastic sides. They attach vertically and individually, providing up to four walls for the food on the board.

FIG. 3 is a view of the cutting and chopping board 10 shown in FIGS. 1 and 2 with attached sides 20. Three of the detachable plastic sides 22, 24, 26 embedded with magnets 27 are held on edges 12 of the cutting and chopping board 10 from the magnetic bond with the 403 stainless steel strips 14.

Figure 4:
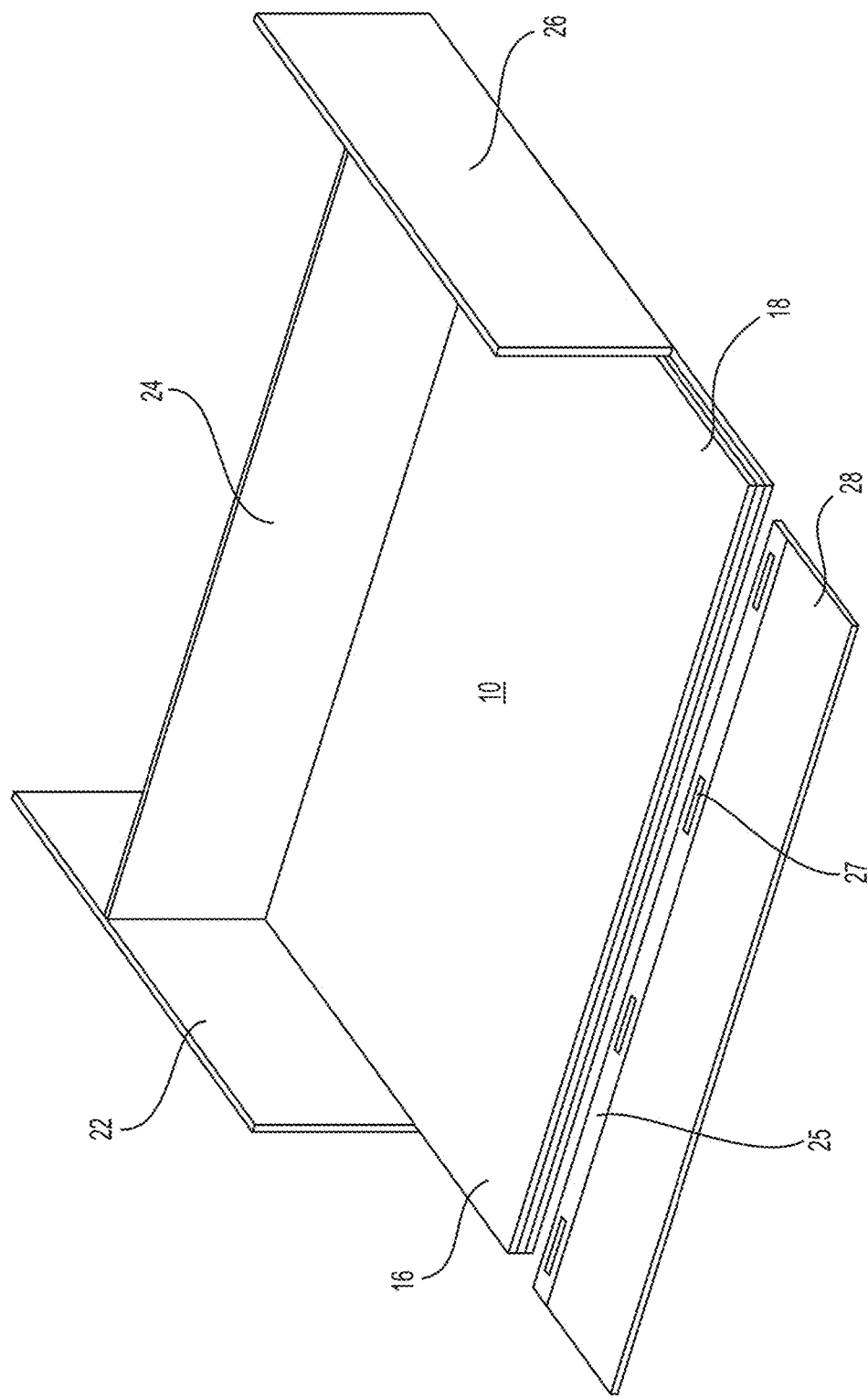
FIG. 4 is a perspective view of the cutting and chopping board shown in FIGS. 1-3 with the two opposite sides slid rearward on the stainless steel strips to leave parts of the opposite edges of the cutting and chopping board free for moving a chopping or cutting knife handle along the cutting and chopping board. The sides may be adjusted according to the maneuvering space required for the task at hand.

FIG. 4 is a view of the cutting and chopping board 10 shown in FIGS. 1-3 with the two opposite sides 22, 26 slid rearward to leave front parts 16 and 18 of the opposite edges of the cutting and chopping board free for moving a chopping or cutting knife handle along the cutting and chopping board.

Figure 5:
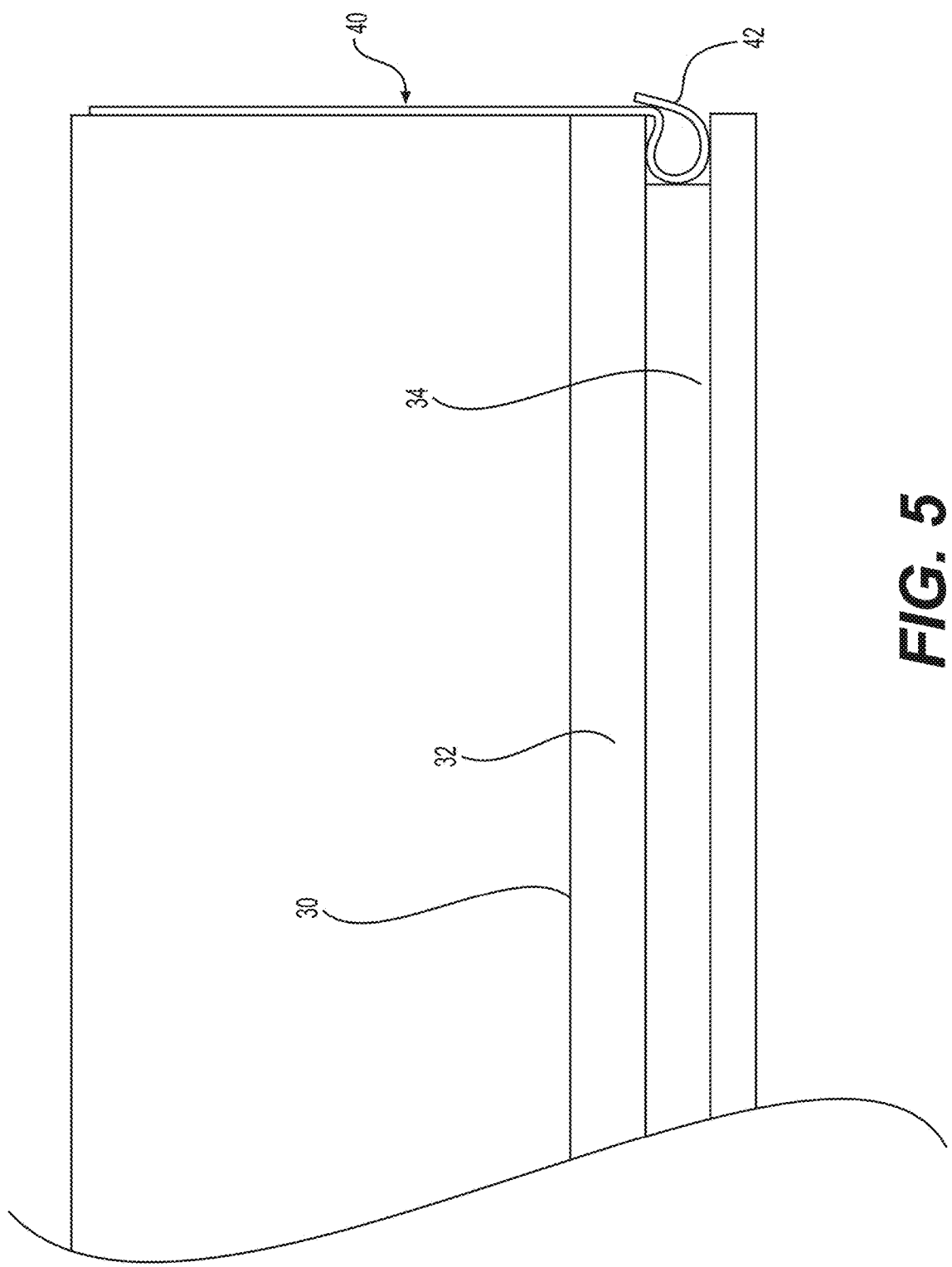
FIG. 5 is an edge view of an embodiment of a second embodiment of the cutting and chopping board showing grooves in its edges that receive and hold inward bends on bases of the attached plastic sides. The bends within grooves structure ensures that the sides are both secure and easily repositionable and removable. This is the tongue and groove method described in the summary of the invention.

FIG. 5 is an edge view of a second embodiment of the cutting and chopping board of the invention. Cutting and chopping board 30 has grooves 34 in edges 32. Grooves 34 receive and hold inward bends 42 along bases of the sides 40 to attach them to the cutting and chopping board 30.

Figure 6:
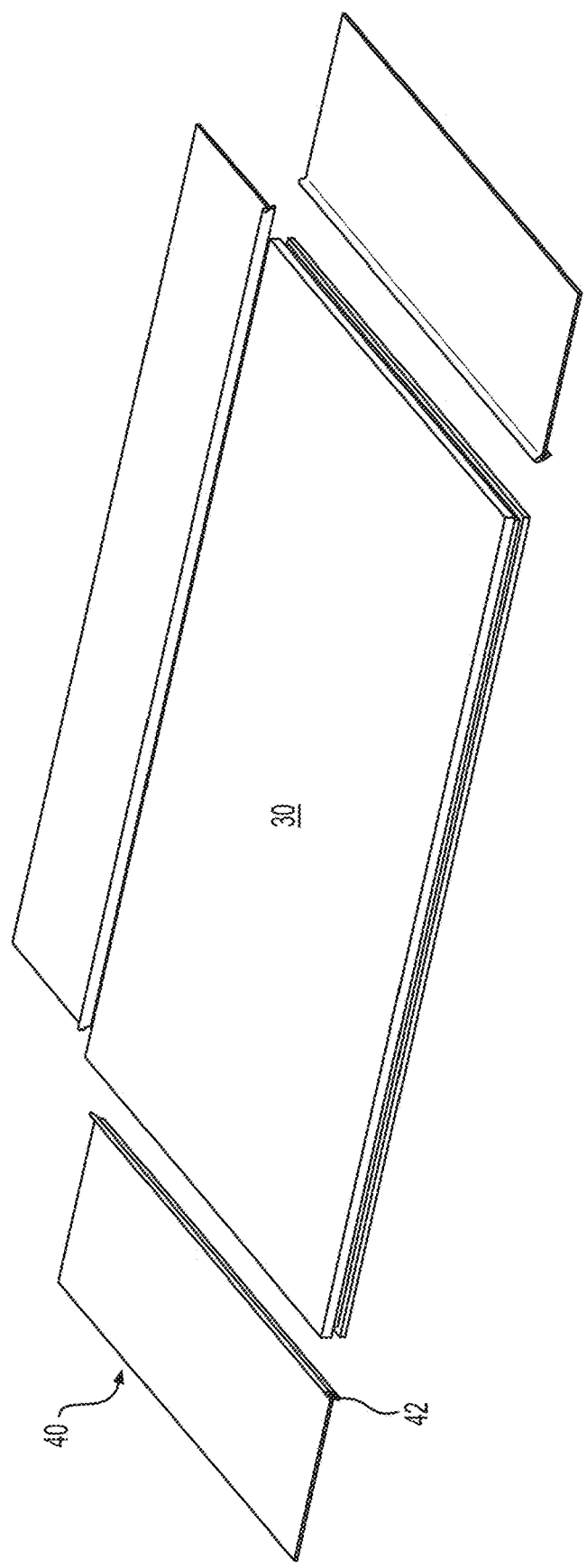
FIG. 6 is an exploded perspective view of the cutting and chopping board shown in FIG. 5 with the sides removed and showing the folded mounting edges of the sides (tongues) for securing in the grooves in the cutting and chopping board.

FIG. 6 is an exploded view of the cutting and chopping board 30 shown in FIG. 5. The sides 40 are removed from the grooves 34 in the cutting and chopping board and are laid along the cutting and chopping board 30. Sides 40 show the folded mounting edges 42 of the sides for securing in the grooves 34 in the edges 32 of the cutting and chopping board 30.

Figure 7:
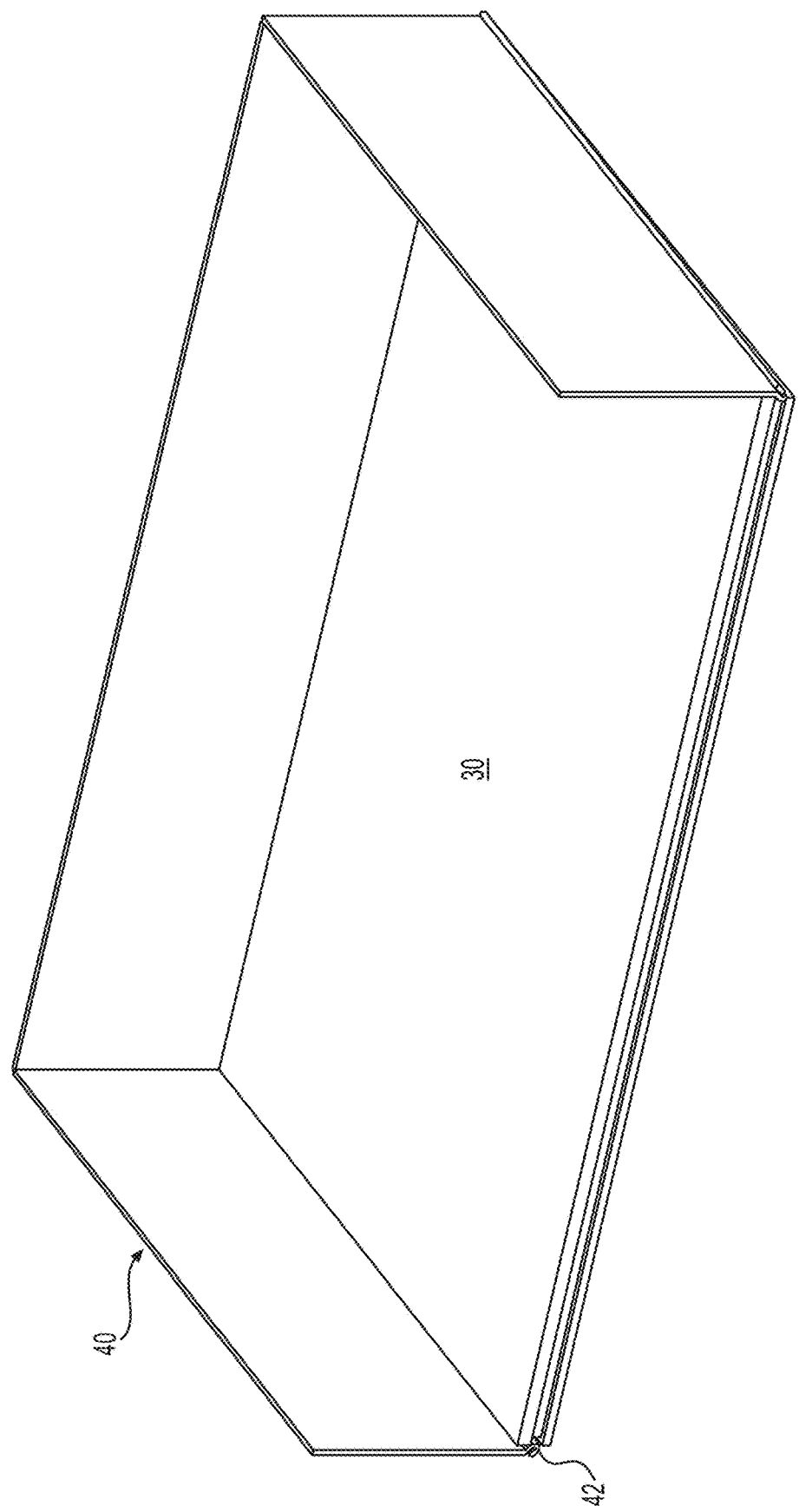
FIG. 7 is a perspective view of the cutting and chopping board shown in FIGS. 5 and 6 with the sides having their folded edges (tongues) held in the grooves of the cutting and chopping board.

FIG. 7 is a perspective view of the cutting and chopping board 30 shown in FIGS. 5 and 6. The sides 40 have their folded edges 42 held in the grooves 34 in edges 32 of the cutting and chopping board.

Alternatively, the grooves 34 in edges 32 of the cutting and chopping board 30 may be sufficiently thin to secure inserted bottom edges of the sides 40.

The new cutting and chopping board with attachable, removable, repositionable retaining sides prevent fruits and vegetables or other food from flying or sliding off the cutting and chopping board. The removability and repositionability of the sides facilitate a wide range of uses with knives, cleavers or other tools, which are able to be used across the entire board without scattering the pieces off the board. Pieces of food which might fly or slide from the board during or after chopping or cutting are trapped on the board, preserving cleanliness and preventing food particles from reaching counter tops or floors. After cutting the foods, particles are easily gathered by pushing them to a side or to a corner intersection of two sides. After removal from the board, one of the sides may be used to scrape the board and push food particles off the board. The attached sides further guide the particles when moving them to bowls, plates or cookware. The removability and repositionability of the sides also provide versatility for chefs to customize board assembly for different food preparation needs. Sometimes just the board is required, but a chef is able to use one, two, three or all four sides. Having removable sides is also beneficial for storage. The cutting and chopping board can be stored just like any other cutting and chopping board, and the sides can be laid flat and stacked in any kitchen cabinet or drawer.

While the invention has been described with reference to specific embodiments, modifications and variations of the invention may be constructed without departing from the scope of the invention, which is defined in the following claims.

I claim:

1. An apparatus comprising: a cutting and chopping board having two short sides with a first length and two long sides with a second length, each one of the short and long sides side includes an edge having a groove extending along an entire length of the edge, wherein magnetically attractable material is embedded along an entire length of the grooves and around an entire perimeter of the cutting and chopping board; two short attachable, removable and repositionable sides with embedded magnet inserts; and two long attachable, removable and repositionable sides with embedded magnet inserts, wherein a length of the short attachable, removable and repositionable sides is substantially equal the first length and a length of the long attachable, removable and repositionable sides is substantially equal the second length, wherein the magnet inserts of the short and long attachable, removable and repositionable sides are magnetically attachable to the magnetically attractable material in the grooves in the edges of the cutting and chopping board, wherein the short and long attachable, removable and repositionable sides have a thickness that is less than a thickness of the cutting and chopping board, wherein the magnetically attractable material on the edges of the cutting and chopping board is adapted for attaching the short and long attachable, removable and repositionable sides along any part of the edges of the cutting and chopping board for a full or partial food barrier, and wherein the magnet inserts on the long and short attachable, removable and repositionable sides cooperate with the magnetically attachable material on the edges of the cutting and chopping board for holding the short and long attachable, removable and repositionable sides substantially vertically on the edges of the cutting and chopping board and holding cut or chopped pieces on the cutting and chopping board, wherein the short and long attachable, removable and repositionable sides are plastic sides embedded with the magnets along lower edges of the short and long attachable, removable, and repositionable sides, wherein the short and long attachable, removable and repositionable sides are repositionable by sliding along the edges and of the cutting and chopping board or by pulling the attachable, removable and repositionable sides off the edges of the cutting and chopping board and reattaching the attachable, removable and repositionable sides in a different position.

2. The apparatus of claim 1, wherein the magnetically attractable material is stainless steel strips embedded in the grooves in the edges of the cutting and chopping board.

3. The apparatus of claim 2, wherein the magnets are spaced along the short and long attachable, removable and repositioning sides.

4. The apparatus of claim 1, wherein the short and long detachable, removable and repositionable sides are held on the edges of the cutting and chopping board by magnetic bond to the magnetically attractable material embedded in the grooves in the edges of the cutting and chopping board.

5. An apparatus comprising: a cutting and chopping board having two short sides with a first length and two long sides with a second length, each one of the short and long sides includes an edge having a groove extending along an entire length of the edge, wherein magnetically attractable material is embedded along an entire length of the grooves and around an entire perimeter of the cutting and chopping board; two short attachable, removable and repositionable sides; and two long attachable, removable and repositionable sides, wherein a length of the short attachable, removable and repositionable sides is substantially equal the first length and a length of the long attachable, removable and repositionable sides is substantially equal the second length, wherein the short and long attachable, removable and repositionable sides have a thickness that is less than a thickness of the cutting and chopping board, complementary quick-release magnet attachments on the short and long attachable, removable and repositionable sides cooperating with the magnetically attractable material in the grooves on the edges of the cutting and chopping board for holding the short and long attachable, removable and repositionable sides substantially vertically on the edges of the cutting and chopping board and holding cut or chapped pieces on the cutting and chopping board, wherein the short and long attachable, removable and repositionable sides are plastic sides embedded with the magnets along lower edges of the short and long attachable, wherein the short and long attachable, removable and repositionable sides are repositioned along the edges of the cutting and chopping board.

\* \* \* \* \*